(12) United States Patent
Wan (10) Patent No.: US 12,195,405 B2
(45) Date of Patent: Jan. 14, 2025

(54) REPAIR OF A SILICON-BASED BONDCOAT

(71) Applicant: General Electric Company, Schenectady, NY (US)

(72) Inventor: Julin Wan, Rexford, NY (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/093,110

(22) Filed: Jan. 4, 2023

(65) Prior Publication Data
US 2024/0217889 A1    Jul. 4, 2024

(51) Int. Cl.
| | |
|---|---|
| C04B 41/50 | (2006.01) |
| C04B 41/00 | (2006.01) |
| C04B 41/45 | (2006.01) |
| C04B 41/52 | (2006.01) |
| C04B 41/87 | (2006.01) |
| C04B 41/89 | (2006.01) |

(52) U.S. Cl.
CPC ...... *C04B 41/5096* (2013.01); *C04B 41/0072* (2013.01); *C04B 41/009* (2013.01); *C04B 41/4539* (2013.01); *C04B 41/4545* (2013.01); *C04B 41/5071* (2013.01); *C04B 41/522* (2013.01); *C04B 41/87* (2013.01); *C04B 41/89* (2013.01)

(58) Field of Classification Search
None
See application file for complete search history.

(56) References Cited

U.S. PATENT DOCUMENTS

| | | |
|---|---|---|
| 4,388,344 A | 6/1983 | Shuskus et al. |
| 7,653,996 B2 | 2/2010 | Jungbluth et al. |
| 7,842,335 B2 | 11/2010 | Skoog et al. |
| 9,238,738 B2 | 1/2016 | Cassuto |
| 9,387,512 B2 | 7/2016 | Lee et al. |
| 9,511,436 B2 | 12/2016 | Kumar et al. |
| 10,150,188 B1 | 12/2018 | Parolini et al. |
| 2013/0157078 A1 | 6/2013 | Onal et al. |
| 2019/0375689 A1 | 12/2019 | Saha et al. |
| 2022/0041519 A1 | 2/2022 | Roberts et al. |

*Primary Examiner* — Colin W. Slifka
(74) *Attorney, Agent, or Firm* — Dority & Manning, P.A.

(57) ABSTRACT

Methods are provided for repairing a defect on a silicon-containing substrate. The method may include applying a powder mixture into the defect of an existing coating on a surface of the silicon-containing substrate, wherein the powder mixture comprises silicon and germanium at a Ge mole fraction of 0.01 to 0.3; and heat treating the powder mixture within the defect at a sintering temperature that is 1150° C. to 1400° C. to form a repaired bondcoat within the defect. Repaired components are also provided that include a repaired bondcoat formed within the defect on the silicon-containing substrate, wherein the repaired bondcoat comprises a silicon-germanium phase comprising a Ge mole fraction of germanium of 0.01 to 0.3 and a Si mole fraction of silicon of 0.7 to 0.99.

18 Claims, 7 Drawing Sheets

REPAIR OF A SILICON-BASED BONDCOAT

FIELD

The present disclosure relates to repair of a silicon-based bondcoat and an environmental barrier coating ("EBC") on a ceramic substrate.

BACKGROUND

Silicon-based materials are employed for high temperature components of gas turbine engines such as, for instance, airfoils (e.g., blades, vanes), combustor liners, and shrouds. The silicon-based materials may include silicon-based monolithic ceramic materials, intermetallic materials, and composites. For example, silicon-based ceramic matrix composites (CMCs) may include silicon-containing fibers reinforcing a silicon-containing matrix phase.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DEFINITIONS

To describe and point out the subject matter more clearly and concisely, the following definitions are provided for specific terms used throughout the following description and the appended claims, unless specifically denoted otherwise.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

The term "defect" as used herein refers to a portion of the protective layers, the substrate, or both exposed to the environment due to damage.

The term "slurry" as used herein refers to a mixture of at least one solid constituent with at least one liquid constituent.

The term "sintering aid" as used herein refers to a material that decreases the sintering temperature of the dried patch material and/or enhances sintering kinetics of the dried patch material at a particular sintering temperature.

The term "viscosity modifier" refers to a material that alters rheology of the slurry as a function of applied stress and/or shear rate during deposition of the slurry.

An "oxidizing atmosphere" is an atmosphere that contains sufficient oxygen partial pressure to cause an oxidation reaction and may include air and combustion gas.

As used herein, the term "silicon-containing substrate" is a substrate that includes silicon, a silicon alloy, a compound having silicon and at least one other element, or a combination of silicon alloy and the compound having silicon and the at least one other element. As used herein in the context of silicon-containing powders, the terms "silicon" and "silicon-based alloy" refer to their respective unoxidized forms.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, an environmental-barrier-coating ("EBC") refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of BaO, SrO, $Al_2O_3$, and/or $SiO_2$ compositions), hermetic layers (e.g., a rare earth disilicate), outer coatings (e.g., comprising a rare earth monosilicate, such as slurry or APS-deposited yttrium monosilicate (YMS)), or any combinations of such layers. One or more layers may be doped as desired, and the EBC may also be coated with an abradable coating.

As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Although silicon-containing substrates exhibit desirable high temperature characteristics, such substrates can suffer from rapid recession in combustion environments. For example, silicon-containing substrates are susceptible to volatilization upon high-temperature exposure to reactive species such as water vapor. In such cases, coatings are used to protect the silicon-containing substrates. Silicon-containing substrates, such as CMCs, may have multiple protective coating layers on its surface, such as a silicon bondcoat, a di-silicate EBC, a mono-silicate EBC, or combinations thereof. These protective layers help to prevent the degradation of silicon-containing substrates in a corrosive water-containing environment by inhibiting the ingress of water vapor and the subsequent formation of volatile products such as silicon hydroxide (e.g., $Si(OH)_4$). Several additional layers, such as an abradable layer, may also be deposited on the EBC to provide specific functionality to CMC components. Thus, the protective layers may enhance the high temperature environmental stability of silicon-containing substrates. Other desired properties for the EBC include a thermal expansion compatibility with the silicon-containing substrate, low permeability for oxidants, low thermal conductivity, and chemical compatibility with the thermally grown silicon-based oxide.

Generally, a bondcoat is disposed between a silicon-based substrate and the EBC to promote good adhesion and to act as a barrier to substrate oxidation. By employing bondcoat compositions that do not form gaseous oxidation products (e.g., $CO_2$, CO, $N_2$), the bondcoat may also help extend the operating life of the silicon-based substrate/EBC system.

Some of the desired properties of the bondcoat include absence of interconnected porosity, low intrinsic oxygen permeability and thermal expansion coefficient compatibility with the substrate. Silicon and silicon-based alloys have been conventionally used as bondcoats. Generally, the bondcoat is applied using thermal spray (e.g., air plasma spray) or chemical vapor deposition (CVD) methods.

During service, one or more of these protective layers may suffer some damage, such as in the form of a defect. If an EBC experiences a localized spall or a pinhole defect, the underlying substrate may be subject to material loss resulting from water vapor-induced volatilization and subsequent surface recession during operation. If allowed to grow unmitigated, such material loss may reduce the load-bearing capability of the component, disrupt airflow, or even progress to through-thickness holes, which may adversely affect the operating performance and durability of the machine. A process to locally patch repair each of the missing protective layers and the underlying material of the silicon-containing substrate is therefore desired. The present disclosure relates to repair of a silicon-based bondcoat between the EBC and the ceramic substrate.

Methods are generally described herein for repairing a defect in a multilayered coating on a silicon-containing substrate that may be performed at relatively low temperature, allowing for field repair (e.g., on-wing) of engine components. One of the biggest challenges of field repair is the effective application of a silicon-based bondcoat. The presently disclosed method(s) generally provides a liquid phase sintering method that facilitates fast densification of a silicon-based powder, which is important for field repair since long sintering time is usually not available for field repair.

The liquid phase sintering method of the silicon-based powder is achieved through the presence of a germanium-based powder with the silicon-based powder in the form of a powder mixture. Germanium (Ge) and silicon (Si) are mutually and infinitely soluble with each other. Additionally, Ge has a melting point of 938.2° C., which is much lower the Si's melting point of 1414° C. In one embodiment, the powder mixture containing both Si and Ge is heated to a sintering temperature that is above the melting point of Ge but below the melting point of Si such that the Ge becomes liquid, locally wetting and dissolving the Si. The molten Ge serves as a transient liquid that provides liquid phase sintering of the Si. Ge also dissolves into the solid Si, which leads to diminishing volume of the liquid phase. Additionally, the liquid phase Ge surrounds and dissolves the Si particles during sintering to inhibit oxidation of the Si. Eventually, as heat treatment proceeds, all of the Ge will be dissolved in Si, forming a sintered, solid state solution of Ge in Si, which forms the repaired bondcoat on which additional EBC layers may be formed.

Advantageously, the formation of the repaired bondcoat allows for an EBC layer to be formed thereon, such that a multilayered patch is formed with layers that are configured to correlate with the respective material of the original composition. In particular embodiments, the powder mixture described herein may allow for fast sintering via an in situ repair process. One of the biggest challenges of field repair is effective application of silicon bondcoat. The method(s) described herein provide a liquid phase sintering method that can facilitate fast densification of the powder mixture, which is important for in situ repair as long sintering time is usually not available for field repair. Moreover, this repair process may be used to repair defects on the silicon-containing substrate in situ, thus minimizing or eliminating the need to disassemble the machine, such as a turbine engine, as would be required for conventional component repairs. Thus, defects on a silicon-containing substrate and its coatings can be repaired in a more timely and cost effective manner as compared to other processes, such as full-scale stripping and recoating.

Through this method, the repair method may allow for a multilayered patch to be formed within the defect such that individual layers of the multilayered patch correlate with the material of the layer of the multilayered coating or substrate that it replaces in the defect. As used here, the term "correlates" means that the patch material will, upon sintering, effectively replace the material and function of the layer of the multilayered coating, the substrate, or both in the defect.

Figure 1A:
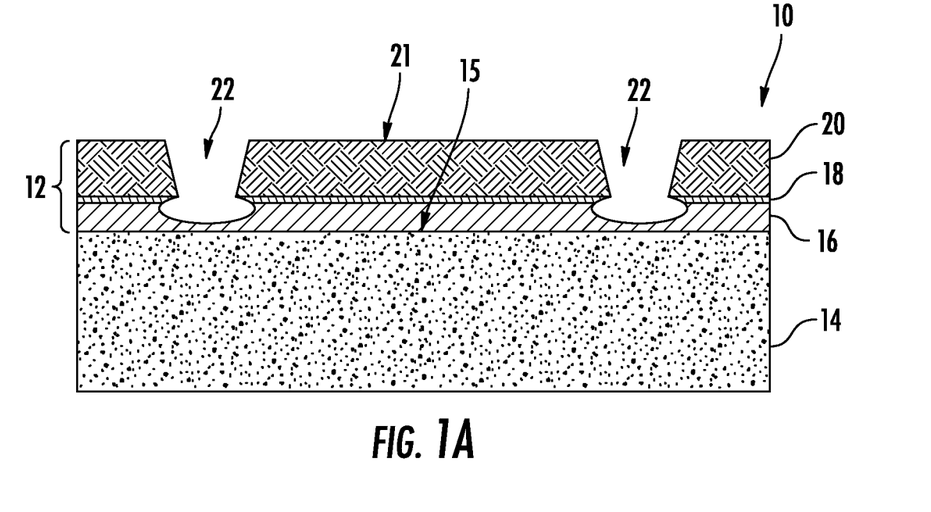
FIG. 1A is a schematic cross-sectional view of a component having defects extending through its environmental barrier coating and into its underlying bondcoat.
Figure 1B:
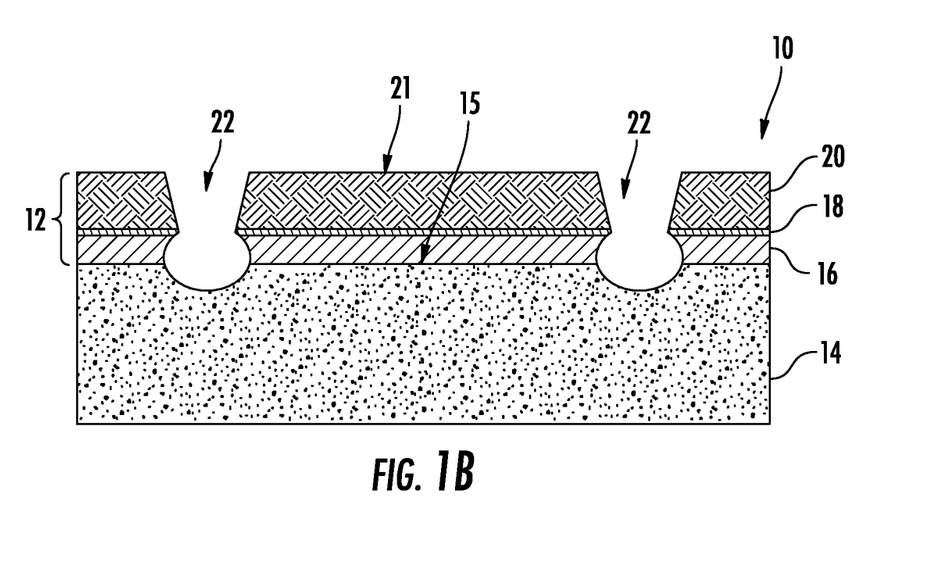
FIG. 1B is a schematic cross-sectional view of a component having defects extending through its environmental barrier coating, through its underlying bond, and into the underlying substrate.

FIGS. 1A and 1B are cross-sectional views of a component 10 for use in a high temperature environment of a gas turbine engine, such as a blade, a vane, a combustor liner, a shroud, etc. In FIGS. 1A and 1B, the component 10 includes a multilayered coating 12 on a surface 15 of a silicon-containing substrate 14. In the embodiment shown, an existing bondcoat 16 is present on the surface 15 of the silicon-containing substrate 14, and a thermally grown oxide layer 18 (TGO layer 18) is present over the bondcoat 16. For example, the thermally grown oxide layer 18 may include silica, particularly when the bondcoat 16 comprises silicon. An EBC 20 is present over the thermally grown oxide layer 18.

The silicon-containing substrate 14 may be selected for its high temperature mechanical, physical, and/or chemical properties. The silicon-containing substrate 14 may include any silicon-containing material, such as a silicon-based ceramic material. In a particular embodiment, the silicon-containing substrate 14 includes a silicon-based CMC, such as a silicon carbide containing matrix reinforced with fibers (e.g., silicon carbide). In another example, the silicon-containing substrate 14 may be a silicon-based monolithic ceramic material, for instance silicon carbide (SiC), silicon nitride ($Si_3N_4$) or a combination of SiC and $Si_3N_4$. In embodiments, the silicon-containing substrate 14 may be fabricated from a material that can withstand combustion environments at operating temperatures greater than 1150° C. for a duration exceeding 20,000 hours.

In embodiments, the existing bondcoat 16 includes elemental silicon, a silicon alloy, a metal silicide, or a combination thereof. The bondcoat 16 may generally promote the adhesion between the substrate 14 and the EBC 20 by helping to bridge any mismatch between the CTE of the relative materials. Additionally, the bondcoat 16 may form a protective thermally grown oxide layer 18 thereon, upon exposure to oxygen. Thus, the bondcoat 16 may prevent oxidation of the underlying substrate 14 by reacting with oxygen before it reaches the substrate. Additionally, the resulting thermally grown oxide layer 18 may prevent oxidation of the silicon-containing substrate 14 by inhibiting the flow of oxygen therethrough. The bondcoat 16 may have a thickness sufficient to promote adhesion of the EBC 20 while remaining as thin as possible, such as in a range from 25 micrometers (microns, μm) to 150 μm. In embodiments, the thermally grown oxide layer 18 may have an initial (as-formed) thickness in a range from 1 μm to 10 μm. The thickness of the thermally grown oxide layer 18 may further increase due to the oxidation of the underlying bondcoat 16 during use.

The EBC 20 may provide a thermal barrier as well as a hermetic seal against the corrosive gases in the hot combustion environment, and thus protect the underlying thermally grown oxide layer 18, bondcoat 16, and silicon-containing substrate 14 from overheating, thermochemical attack, or a combination thereof. By way of example, as described above, the protective coatings present over silicon-containing substrate 14 advantageously facilitate inhibition of one or more of oxidation, overheating, or volatilization of the silicon-containing substrate material in a hot combustion environment of a gas turbine engine.

The EBC 20 may be a single layer or may include two or more layers. No matter the particular configuration, the EBC 20 may have a total thickness of 25 μm to 1000 μm on the bondcoat 16. In embodiments, the EBC 20 may comprise one or more rare earth (Ln) silicates. In embodiments, the silicate of the Ln element may include, but is not limited to, a rare earth monosilicate ($Ln_2SiO_5$), a rare earth disilicate ($Ln_2Si_2O_7$), or a combination of $Ln_2SiO_5$ and $Ln_2Si_2O_7$. In embodiments, the Ln element in the Ln silicate may include at least one of yttrium, scandium, and elements of the lanthanide series. By way of example, the Ln elements may include yttrium, ytterbium, or lutetium in particular embodiments.

Optionally, one or more additional coatings (not shown) may be located above or below the EBC 20. Such additional coatings may provide additional functions to the component 10, such as further thermal barrier protection, recession resistance, abradable sealing, thermochemical resistance to corrosion, resistance to erosion, resistance to impact damage, or resistance to inter-diffusion between adjacent layers. In embodiments, the EBC 20 and the optional one or more layers may have a coefficient of thermal expansion that is substantially close to a coefficient of thermal expansion of the silicon-containing substrate 14.

Generally, the component 10 of FIGS. 1A and 1B has at least one defect 22 extending from its outer surface 21, as described in greater detail below. Depending on the severity of the damage to the component 10, material loss may be accompanied by recession in the EBC 20, in the thermally grown oxide layer 18, the bondcoat 16, or the silicon-containing substrate 14 itself.

Referring to FIG. 1A, a defect 22 extends through the EBC 20, through the TGO layer 18, and into the bondcoat 16. Referring to FIG. 1B, a defect 22 extends through the EBC 20, through the TGO layer 18, through the bondcoat 16, and into the silicon-containing substrate 14. In one particular embodiment, the method may include determining that the defect 22 extends into the bondcoat 16 or into the silicon-containing substrate 14. Such a determination may be performed by visual inspection of the defect 22, depth measurement of the defect 22, compositional analysis of the defect 22, or other suitable methods. For instance, if a silicon-based material is detected, it can be determined that the defect 22 extends into the bondcoat 16 (FIG. 1A) or into the silicon-containing substrate 14 (FIG. 1B), since both materials are silicon-based.

Figure 2A:
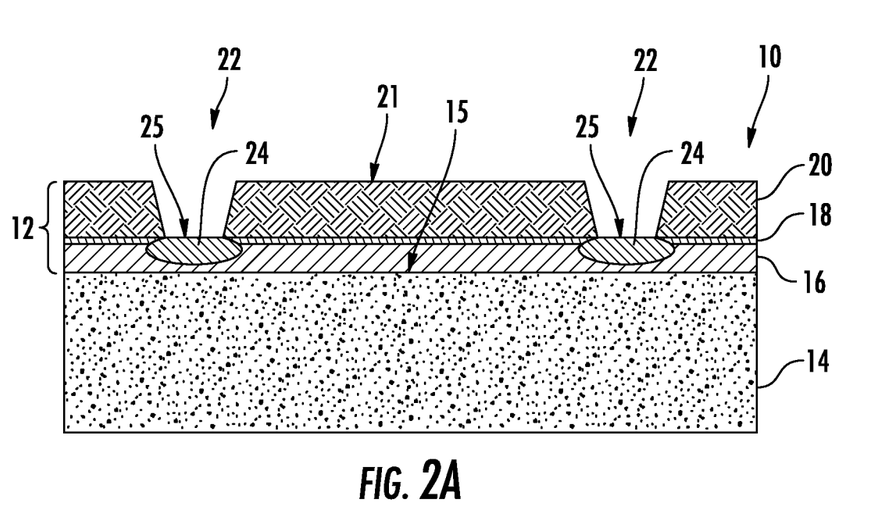
FIG. 2A is a schematic cross-sectional view of a component having one or more damaged locations in which a powder mixture has been applied into the defects of the component in FIG. 1A.
Figure 2B:
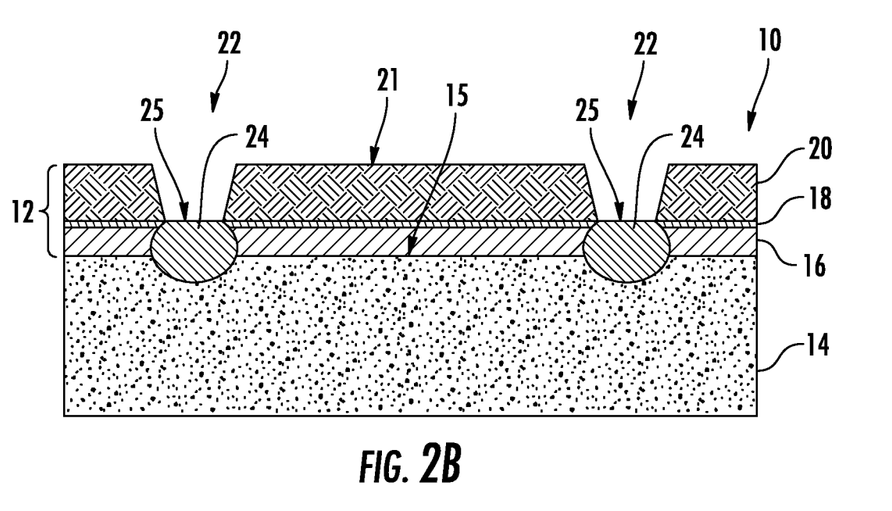
FIG. 2B is a schematic cross-sectional view of a component having one or more damaged locations in which a powder mixture has been applied into the defects of the component in FIG. 1B.
Figure 6:
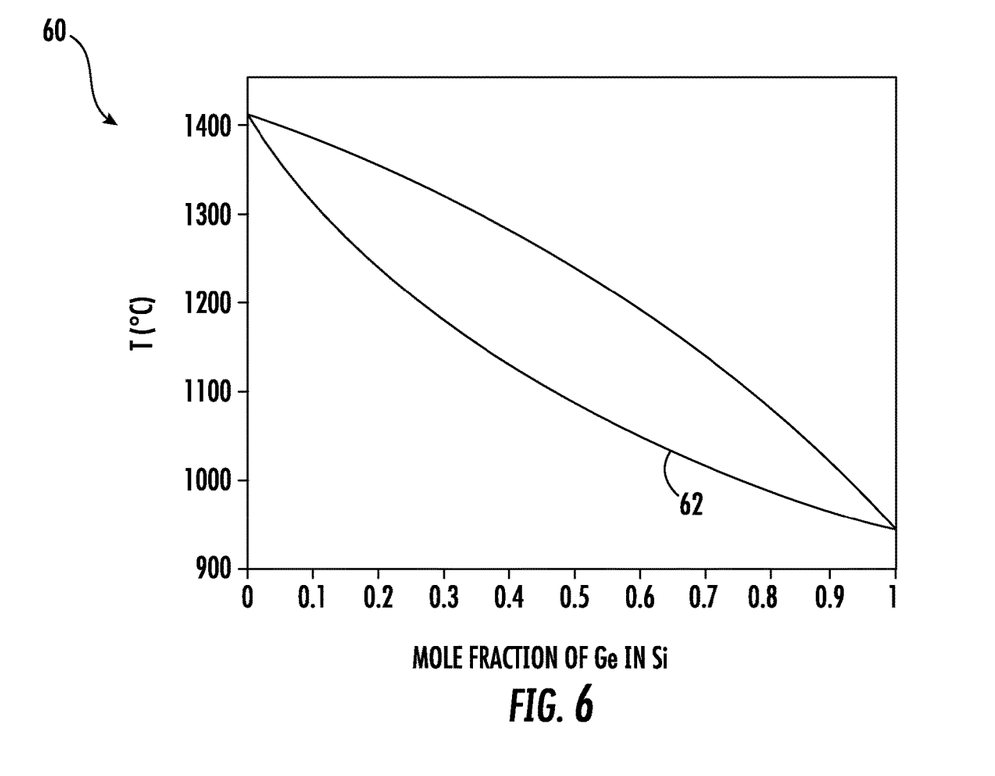
FIG. 6 shows a solid-liquid phase diagram of germanium (Ge) and silicon (Si)

Generally, the method includes applying a powder mixture 24 into the defect 22 as shown in FIGS. 2A and 2B. The powder mixture 24 includes silicon and germanium as stated above to allow for a relatively low sintering temperature that is above the melting point of Ge but below the melting point of Si, such as 1150° C. to 1400° C. (e.g., 1200° C. to 1375° C.). Referring to FIG. 6, a solid-liquid phase diagram 60 is shown for a combination of Ge and Si (mole fraction). As shown, the solidus temperature 62 falls from the Si melting point of 1414 as the Ge mole fraction increases. However, if too much Ge is included in the resulting repaired bondcoat, then the functionality of the Si phase may be diminished to a point of ineffectiveness. In one embodiment, the powder mixture 24 includes germanium at a Ge mole fraction of 0.01 to 0.3 (e.g., 0.05 to 0.1). That is, the powder mixture 24 may include germanium at 1 mol. % to 30 mol. % (e.g., 5 mol. % to 10 mol. %). Conversely, the powder mixture 24 includes silicon at a Si mole fraction of 0.07 to 0.99 (e.g., 0.9 to 0.95). That is, the powder mixture 24 may include silicon at a Si mole fraction of 70 mol. % to 99 mol. % (e.g., 90 mol. % to 95 mol. %). Without wishing to be bound by any particular theory, it is believed that this amount of Ge within the resulting mixture allows for a suitable sintering temperature while keeping the relative amount of Si present in the repaired bondcoat sufficient for its effective use. The powder mixture 24 may be heated to the sintering temperature utilizing a heating source, such as a torch, a laser beam, a furnace, or the combustion gas of the engine (particularly for an in-situ repair process).

As stated above, the presence of Ge in the powder mixture 24 allows for heating to a sintering temperature that is above the melting point of Ge but below the melting point of Si such that the Ge becomes liquid, locally wetting and dissolving the Si. Ge also dissolves into the solid Si, which leads to diminishing volume of the liquid phase. Additionally, the liquid phase Ge surrounds and dissolves the Si particles during sintering to inhibit oxidation of the Si. Thus, the molten Ge serves as a transient liquid that provides liquid phase sintering of the Si. Eventually, as heat treatment proceeds, all of the Ge will be dissolved in Si, forming a sintered, solid state solution of Ge in Si, which forms the repaired bondcoat on which additional EBC layers may be formed.

Figure 7:
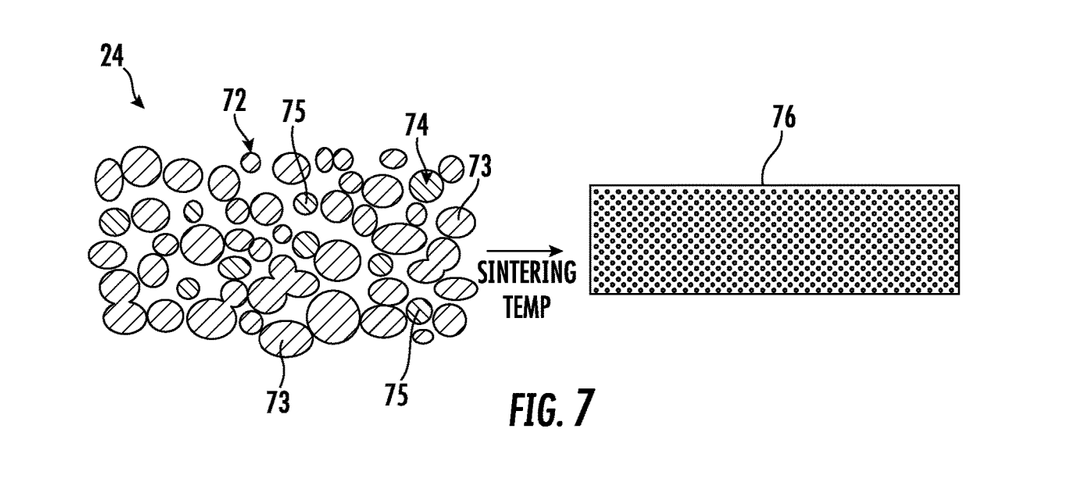
FIG. 7 shows a powder mixture of a silicon-based powder and a germanium-based powder sintered to a repaired bondcoat that includes silicon and germanium.

Referring to FIG. 7, a powder mixture 24 is shown including a silicon-based powder 72 (of silicon-based particles 73) and a germanium-based powder 74 (of germanium-based particles 75). For example, the silicon-based powder 72 includes a silicon-based material, and the germanium-based powder 74 includes a germanium-based material. In an alternative embodiment shown in FIG. 8, the powder mixture 24 includes a core-shell particles 80 that have a core 82 surrounded by a shell 84. For example, the core 82 includes a silicon-based material, and the shell 84 includes a germanium-based material.

Figure 8:
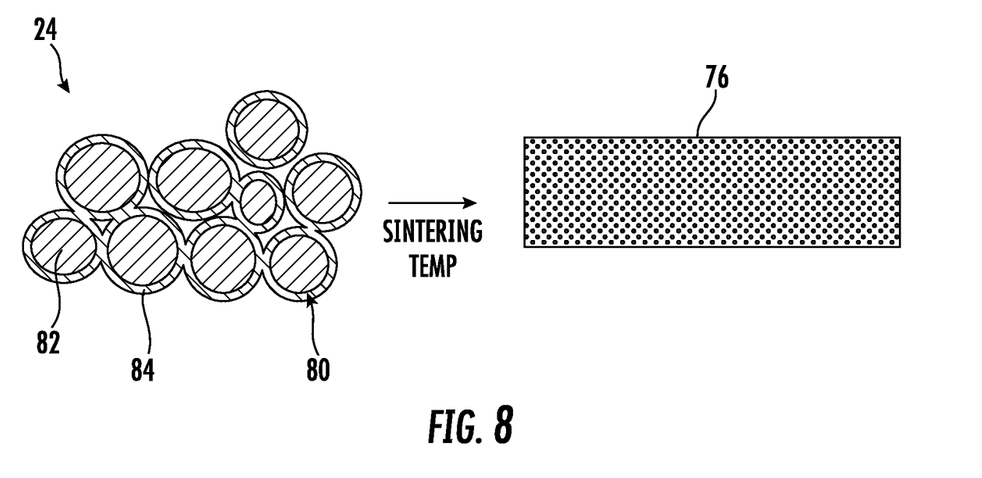
FIG. 8 shows a powder mixture of a core-shell particles (e.g., a silicon-based core and a germanium-based shell) sintered to a repaired bondcoat that includes silicon and germanium.

In one embodiment, the silicon-based material in the powder mixture 24 may be in the form of elemental silicon (i.e., pure silicon), a silicon alloy having at least 90% by weight silicon, a metal silicide, or a combination thereof. For example, the silicon in the powder mixture 24 may consist essentially of pure silicon in particular embodiments. In embodiments, a suitable silicon alloy having at least 90% by weight silicon may include alloying elements such as germanium, aluminum, nitrogen, phosphorous, iron, or a combination thereof, as desired to control desired properties of the bondcoat 16. In embodiments, the first patch material (in particular, the silicon-containing powder) has a relatively low amount of carbon, nitrogen, or both (e.g., less than 0.5 wt. % or substantially free from carbon and/or nitrogen) so as to avoid reaction with the silicon-based material of the bondcoat 16, reaction with the substrate 14, oxidation during use, or combinations thereof.

In one embodiment, the germanium-based material in the powder mixture 24 may be in the form of germanium (i.e., pure germanium), a germanium-based alloy having at least 90% by weight germanium, or a combination thereof. For example, the germanium in the powder mixture may consist essentially of pure germanium in particular embodiments.

In embodiments, it may be desired to use a powder mixture 24 of relatively small particles. A known challenge in using a slurry having predominately small-sized particles is the occurrence of excessive sintering shrinkage and subsequent cracking. For instance, during sintering in an oxidizing atmosphere, the elemental silicon, silicon alloy(s), or metal silicide may experience reduced oxidation due to the presence of Ge; however, smaller particles may have too much surface area, resulting increased oxidation. In embodiments, the powder mixture may have an average particle size of 0.1 µm to 20 µm, such as 0.5 µm to 5 µm.

The powder mixture 24 may be applied into the defect 22, in certain embodiments, without a sintering aid present. Additionally or alternatively, the powder mixture 24 may be applied into the defect 22, in certain embodiments, without a binder present.

In one embodiment, the powder mixture 24 is applied as a dry pack that is substantially free from a carrier fluid into the defect 22. In such an embodiment, a EBC slurry(ies) may be subsequentially applied onto the powder mixture 24 within the defect 22, as described in greater detail below. The applied EBC slurry may be sufficient to hold the powder mixture 24 within the defect 22 before and after drying of the EBC slurry for subsequent sintering at the sintering temperature. In an alternative embodiment, the powder mixture 24 is suspended in a liquid carrier (e.g., a water-based carrier) to form a paste, which is then dried to remove the liquid carrier prior to sintering at the sintering temperature.

Generally, the powder mixture 24 may be applied into the defect 22 in an amount sufficient to substantially fill the defect 22 at least up to the TGO layer 18 since the powder mixture 24 includes a silicon-containing material generally correlating with the composition of the TGO layer 18, the bondcoat 16, and the substrate 14.

In particular embodiments, the method also includes applying an EBC slurry into the defect 22 and onto the powder mixture 24. The EBC slurry includes an EBC patching material suspended in a liquid carrier (e.g., a water-based carrier). The EBC patching material may correlate with the material of the EBC 20. Generally, the EBC patching material may be applied into the defect 22 in an amount sufficient to substantially fill the defect 22 to the outer surface 21 of the EBC 20. In one particular embodiment, such an EBC slurry may be applied before sintering of the underlying powder mixture 24. Then, sintering can be performed together on both of the powder mixture 24 and the EBC patching material, such as in situ as described below.

As stated, the EBC patching material may correlate with the material of the EBC 20. For example, when the EBC 20 includes a silicate-based material, then the EBC patching material may include a silicate-based material. For example, the silicate-based material may be in the form of a silicate-containing powder, such as a rare earth element silicate powder. The silicate-containing powder may include at least one of a rare earth monosilicate ($Ln_2SiO_5$) or a rare earth disilicate ($Ln_2Si_2O_7$), such as $Yb_2Si_2O_7$. Suitable non-limiting examples also include zirconium silicate ($ZrSiO_4$), hafnium silicate ($HfSiO_4$), aluminum silicate (e.g., 3:2 mullite, having a chemical formula $Al_6Si_2O_{13}$), and combinations thereof. Such materials may serve as an environmental barrier, as well as correlating with the material of the EBC 20. In one embodiment, the rare earth element silicate powder includes a rare earth element having a cation radius of less than 0.95 Angstroms.

The silicate-containing powder may also include silica ($SiO_2$). In embodiments, the patch material contains sufficient silica to form a silica-rich glass during sintering.

In such embodiments, particle size distribution of the silicate-containing powder used in each patch material may be important in determining the mechanical integrity, porosity, and processability of the disposed coating. In embodiments, the silicate-containing powder includes a plurality of small particles with median particle size less than 1 µm. The median particle size of powders is measured as median diameter by volume. The median diameter by volume may be measured using various methods, such as, for example, laser scattering.

In embodiments, the silicate-containing powder used for forming each patch material includes a bimodal distribution of particles. The silicate-containing powder having a bimodal distribution of particles may include small and medium particles or small and large particles. In embodiments, the silicate-containing powder used for forming each patch material includes a trimodal distribution of particles that includes a distribution of large, medium, and small particles. Multimodal distribution of particles improves packing density by filling voids created by larger particles with finer particles. Larger particles provide a shrinkage-resistant backbone to the patch and medium particles act as filler, while finer particles promote sintering and bonding to adjacent particles and the silicon-containing substrate. Multimodal distribution of the particles thus helps minimize patch shrinkage (during drying and sintering), mitigating cracking and delamination, therefore enabling thicker patches.

Appropriate selection and control of size and volume fractions of the large, medium, and small particles of the silicate-containing powder may aid in providing the EBCs with the desired properties for a particular application. For example, the silicate-containing powder may include a plurality of small particles having a median particle size of less than 1 µm, a plurality of medium particles having a median particle size from 1 µm to 8 µm; and a plurality of large particles having a median particle size of greater than 8 µm. In such an embodiment, the plurality of small particles may be present in an amount of 10 volume % to 50 volume % of the total volume of the silicate-containing material, the plurality of medium particles may be present in an amount of 10 volume % to 50 volume % of the total volume of the silicate-containing material, and the plurality of large particles may be present in an amount of 20 volume % to 60 volume % (e.g., 30 volume % to 50 volume %) of the total volume of the silicate-containing material.

Other components may be present in the EBC patching material, including but not limited to, a binder, a viscosity modifying agent, a sintering aid, etc., or a combination thereof.

Figure 3A:
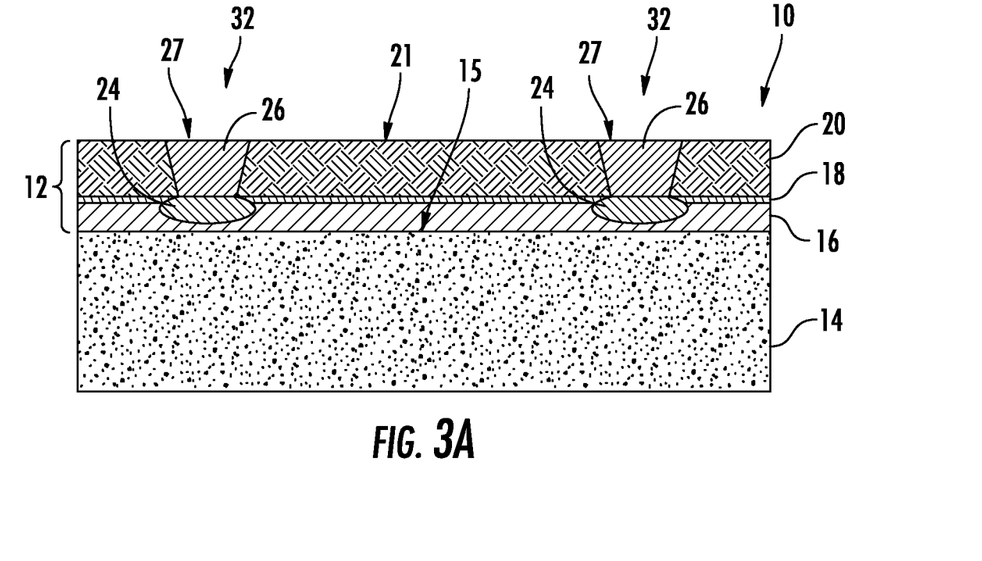
FIG. 3A is a schematic cross-sectional view of a component having one or more damaged locations in which a EBC patching material has been applied into the defects of the component in FIG. 2A.
Figure 3B:
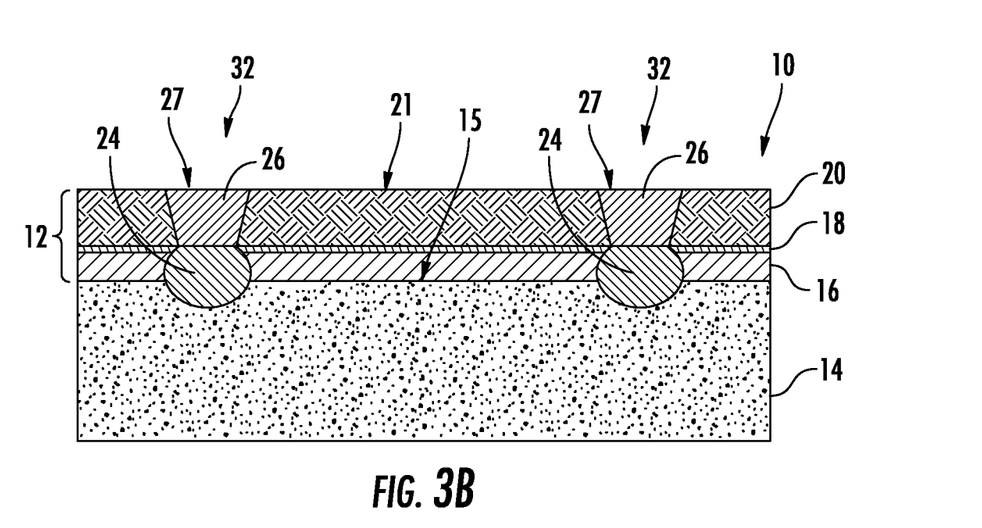
FIG. 3B is a schematic cross-sectional view of a component having one or more damaged locations in which a EBC patching material has been applied into the defects of the component in FIG. 2B.

Referring to FIGS. 3A and 3B, the EBC patching material may be dried to form a dried EBC patch 26 from the EBC patching material. In embodiments, drying may be performed by heating the EBC patching material within the defect 22, such as at a drying temperature of 50° C. to 250° C. Alternatively, the EBC patching material may be dried through evaporation of the liquid carrier at room temperature.

After drying, the dried EBC patch 26 may substantially fill the defect 22 to extend to the outer surface 21 of the EBC 20. Thus, the dried EBC patch 26 may form an outer patch surface 27 that substantially corresponds to outer surface 21 of the EBC 20.

Additional slurry applications and respective drying may be sequentially preformed to produce additional dried EBC patch as required to repair additional layers exposed by the defect.

In each EBC slurry described above, a binder may be present to facilitate application of the patch slurry, promote adhesion of the EBC patch slurry to the silicon-containing substrate, improve the green strength of the EBC patch slurry after drying, or a combination thereof. The binder may be an inorganic binder or an organic binder. In embodiments, the binder is an organic binder primarily composed of elements that volatilize during heat treatment, such as binder burnout or sintering, such that they are not present in the final patch. Non-limiting examples of such binders include monoethylene glycol, diethylene glycol, triethylene glycol, tetraethylene glycol, glycerol, polyethylene glycol (PEG), dibutyl phthalate, bis(2-ethylhexyl) phthalate, bis(n-butyl) phthalate, butyl benzyl phthalate, diisodecyl phthalate, di-n-octyl phthalate, diisooctyl phthalate, diethyl phthalate, diisobutyl phthalate, di-n-hexyl phthalate, di(propylene glycol) dibenzoate, di(ethylene glycol) dibenzoate, tri(ethylene glycol) dibenzoate, polyvinyl pyrrolidone (PVP), or any combinations thereof. In embodiments, the binder is PVP.

In embodiments, the binder may include a silicon-containing resin material. For example, when applying to correlate to the EBC, the slurry composition may include a binder of a silicon-containing resin material such as, for instance, a cross-linked polyorganosiloxane resin.

In embodiments, the EBC patch slurries may include a viscosity modifier. Suitable viscosity modifiers may include polyethylene glycol (PEG), dimethylsiloxane, silicone oil, phthalates, adipates, glycerin, or combinations thereof. The viscosity modifier may be present in an amount from 0.05 weight % to 0.7 weight % of the patch material.

Various compositions and amounts of sintering aids may be used in the EBC patch slurries, when present. In embodiments, the sintering aid may include metallic oxides. Non-limiting examples of metallic oxides that can be used as sintering aid include iron oxide, gallium oxide, manganese oxide, aluminum oxide, nickel oxide, titanium oxide, boron oxide, and alkaline earth oxides. In embodiments, a sintering aid may include a metal. Non-limiting examples of metallic sintering aids include iron, aluminum, boron, and nickel. In an exemplary embodiment, the sintering aid is boron. In embodiments, the boron may at least partially oxidize during sintering and the resulting boron oxide may function as the sintering aid. In embodiments, a sintering aid may include hydroxides, carbonates, oxalates, or any other salts of the above-mentioned metallic elements. In embodiments, a median particle size of the sintering aid used herein is less than 1 µm.

In embodiments, the liquid carrier may partially or fully dissolve the binder, the sintering aid, or a combination thereof. The liquid carrier may be organic or aqueous. Non-limiting examples of suitable organic solvents that can be employed as a liquid carrier include methanol, ethanol, propanol, butanol, pentanol, hexanol, heptanol, octanol, nonanol, decanol, dodecanol, diacetyl alcohol, acetone, methyl isobutyl ketone (MIBK), methyl ethyl ketone (MEK), toluene, heptane, xylene, ether, or combinations thereof. In embodiments, the liquid carrier includes diacetone alcohol. The liquid carrier may further include an additional solvent which, in embodiments, facilitates dissolving of a silicon-based binder. In embodiments, the liquid carrier may include a particular combination of two or more liquids.

The strength, volumetric density, degree of oxidation, and hermeticity of a multilayered patch in the defect 22 may depend on each patch slurry's characteristics, processing methods, or both. For example, slurry characteristics can include relative amounts of the patch material and the liquid carrier in the patch slurry, particle size distribution of the patch material constituents, the type of binder, the amount of the binder, the type of sintering aids, the amount of the sintering aids, the type of viscosity modifier, the amount of viscosity modifier or any combination thereof. These properties may further vary depending on the processing methods, such as, for example, the methods used for applying the patch slurries, drying the patch slurries, or sintering the dried patch layers.

The relative amounts of EBC patch material and liquid carrier in each patch slurry may affect the consistency and viscosity of the patch slurry, as well as the porosity, adhesion, or strength of the dried EBC patch layer and the multilayered patch. In embodiments, the patch slurries include the patch material in an amount of 10 volume % to 60 volume %. For example, the first patch slurry may include the first patch material in an amount of 10 volume % to 60 volume % within a liquid carrier, and the EBC patch slurry may include the EBC patch material in an amount of 10 volume % to 60 volume % within a liquid carrier.

In embodiments, each EBC patch material includes the binder in an amount from 2 weight % to 9 weight % of the silicate-containing powder. In embodiments, each EBC patch material includes the binder in an amount from 4 weight % to 6 weight % of the silicate-containing powder.

In embodiments, each EBC patch material includes the viscosity modifier in an amount from 0.05 weight % to 0.7 weight % of the patch material.

In embodiments, each EBC patch material may include the sintering aid in an amount from 0.2 weight % to 8 weight % based on the total weight of the silicate-containing powder present in the patch material. In embodiments, each EBC patch material may include the sintering aid in an amount from 0.4 weight % to 2 weight % based on the total weight of the silicate-containing powder present in the patch material.

Each EBC patch slurry may be formed using conventional techniques of mixing known to those skilled in the art, such as shaking, ball milling, attritor milling, or mechanical mixing. Ultrasonic energy may be simultaneously used along with the above-mentioned mixing methods to help break apart any agglomerated particles that may be present in the patch slurries.

In embodiments, the EBC patch slurries may be disposed in a defect 22 of component 10 to make the various slurry patch layers using any conventional slurry deposition method known to those skilled in the art, including but not limited to, spraying, dipping the component into a slurry bath, painting, rolling, stamping, syringe-dispensing, extruding, spreading or pouring the slurry onto the defect 22 of the silicon-containing substrate.

In embodiments, undamaged areas of the EBC 20 and silicon-containing substrate 14 may be masked to prevent deposition of the EBC patch slurries onto the undamaged areas. The EBC patch slurries may optionally be mechanically agitated before disposing on the silicon-containing substrate 14 by any method known to those skilled in the art to affect adequate dispersion of the silicon-containing powder, the binder, and the sintering aid in the slurries and ultimately in the dried patch layers formed after drying the patch slurries.

In embodiments, drying of the EBC patch slurries occurs under ambient conditions through evaporation of the solvent. In embodiments, drying of the EBC patch slurries is carried out under elevated temperatures below the sintering temperature before sintering to form the multilayered patch.

The thickness of the dried EBC patch may be controlled either during deposition of the EBC patch slurry or by removing excess slurry material after deposition, before or after drying. In embodiments, the thickness of each dried EBC patch layer may be in a range from 10 μm to 1000 μm.

Figure 4A:
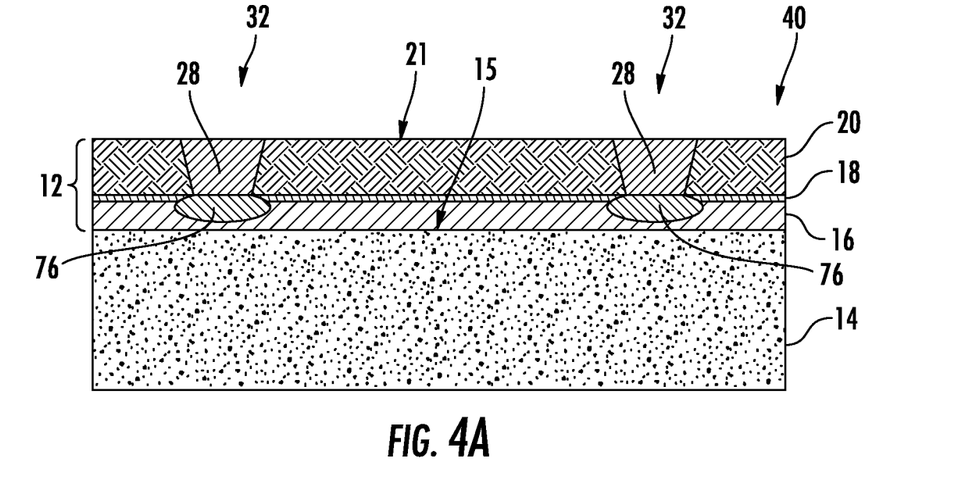
FIG. 4A is a schematic cross-sectional view of a component having one or more damaged locations in which the powder mixture and the EBC patching material has been sintered within the defects to form a multilayer patch (including a repaired bondcoat) within the defects of the component in FIG. 3A.
Figure 4B:
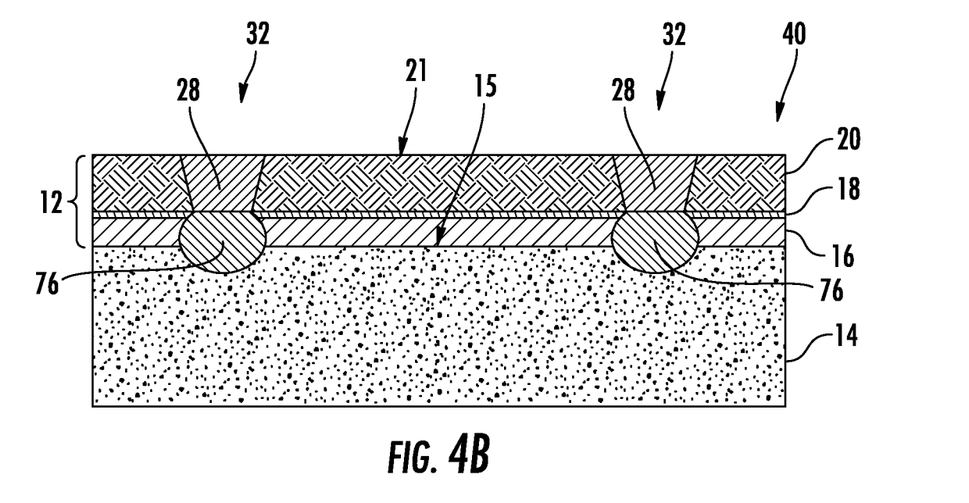
FIG. 4B is a schematic cross-sectional view of a component having one or more damaged locations in which the powder mixture and the EBC patching material has been sintered within the defects to form a multilayer patch (including a repaired bondcoat) within the defects of the component in FIG. 3B.

After drying, the powder mixture 24 and the dried EBC patch layer 26 may then be sintered to form the multilayered patch 32 as shown in FIGS. 4A and 4B, representing a repaired component 40. In embodiments, the sintering is carried out by heat treatment in an oxidizing atmosphere at a sintering temperature greater than 1150° C. to 1400° C. In embodiments, the sintering may be carried out by operating the turbine, thereby bringing the dried EBC patch 26 and powder mixture 24 to a temperature high enough to sinter. In embodiments, the sintering includes heating at the sintering temperature for at least 1 minute, such as for a duration of 2 hours to 48 hours.

In embodiments, the dried EBC patch 26 may be subjected to an optional binder removal before the above-mentioned sintering. Binder removal may be carried out by a slow or step-wise heating of the dried patch material to a temperature less than 800° C. in an oxidizing atmosphere, such as air. A slow or step-wise heating of the dried EBC patch 26 may help to dissociate any bound fluid and to burn out the binder without generating excessive gas pressures that may degrade the integrity of the dried and sintered patch materials.

In embodiments, sintering may carried out in an oxidizing atmosphere. The oxidizing atmosphere includes ambient air. In embodiments, the oxidizing atmosphere during sintering includes combustion gases that may be present around the component 10 during operation.

The optional binder removal and sintering may be affected in a separate heating step or during the first operation of the component 10. Binder removal and sintering may be affected using a conventional furnace or by using methods such as, for example, microwave, laser, combustion torch, plasma torch, and infrared heating. In embodiments, sintering may be accomplished by heating the dried EBC patch 26 at a rate from 1° C./min to 500° C./min to a temperature in a range from 1150° C. to 1400° C. and holding at that temperature for up to 48 hours. In embodiments, sintering may be accomplished by heating the dried EBC patch 26 at a rate from 5° C./min to 10° C./min to a temperature in a range from 1200° C. to 1375° C. and holding at that temperature for up to 48 hours.

In one embodiment, sintering may densify the powder mixture 24 and the dried EBC patch 26. More specifically, they may be densified to form a sintered multilayer patch 32 with a repaired bondcoat 76 (corresponding to the powder mixture 24) and a sintered EBC patch portion 28 (corresponding to the dried EBC patch layer 26). In these embodiments, the respective powder mixtures 24 are shown forming a repaired bondcoat 76 after exposure to the sintering temperature. The repaired bondcoat 76 may include a silicon-germanium phase comprising a Ge mole fraction of germanium of 0.01 to 0.3 and a Si mole fraction of silicon of 0.7 to 0.99. For example, the silicon-germanium phase may be a continuous phase since silicon and germanium are soluble within each other.

Without wishing to be bound by any particular theory, it is believed that the transient liquid, starting with molten Ge and evolving into Ge—Si of different composition, enables local dissolution of Si particles, thus enhancing neck forming and shrinkage. Using the transient liquid phase, fast sintering is facilitated for use via short sintering cycle with heating source that is available for field (or "on-wing") repair. Additionally, the liquid phase disappears after sintering, providing an all-solid bondcoat.

In embodiments, the drying of the EBC patch slurries and subsequent sintering of the powder mixture 24 and dried EBC patch 26 may be achieved to repair the component 10 in situ. For example, the EBC patch 26 may be dried at the ambient temperatures, and the powder mixture 24 and dried EBC patch 26 may be sintered during the first high temperature operation of the component 10.

In embodiments, the silicon-based material in the silicon-based powder 72 includes a multi-modal distribution of silicon-based particles 73, such as a bimodal distribution that may include small and medium particles or small and large particles. In embodiments, the bimodal distribution of silicon-based particles 73 used for forming each patch material includes a trimodal distribution of particles that includes a distribution of large, medium, and small particles. Multimodal distribution of particles may improve packing density by filling voids created by larger particles with finer particles. Larger particles provide a shrinkage-resistant backbone to the patch and medium particles act as filler, while finer particles promote sintering and bonding to adjacent particles and the silicon-containing substrate. Multimodal distribution of the particles thus helps minimize patch shrinkage (during drying and/or sintering), mitigating cracking and delamination.

Appropriate selection and control of size and volume fractions of the large, medium, and small particles of the silicon-based powder 72 may aid in providing the bondcoat with the desired properties for a particular application. For example, the silicon-based material in the silicon-based powder 72 may include a plurality of small particles having a median particle size of less than 1 μm, a plurality of medium particles having a median particle size from 1 μm to 8 μm; and a plurality of large particles having a median particle size of greater than 8 μm. In such an embodiment, the plurality of small particles may be present in an amount of 10 volume % to 50 volume % of the total volume of the silicon-based material in the powder mixture 24, the plurality of medium particles may be present in an amount of 10 volume % to 50 volume % of the total volume of the silicon-based material in the powder mixture 24, and the plurality of large particles may be present in an amount of 20 volume % to 60 volume % (e.g., 30 volume % to 50 volume %) of the total volume of the silicon-based material in the powder mixture 24.

Figure 5:
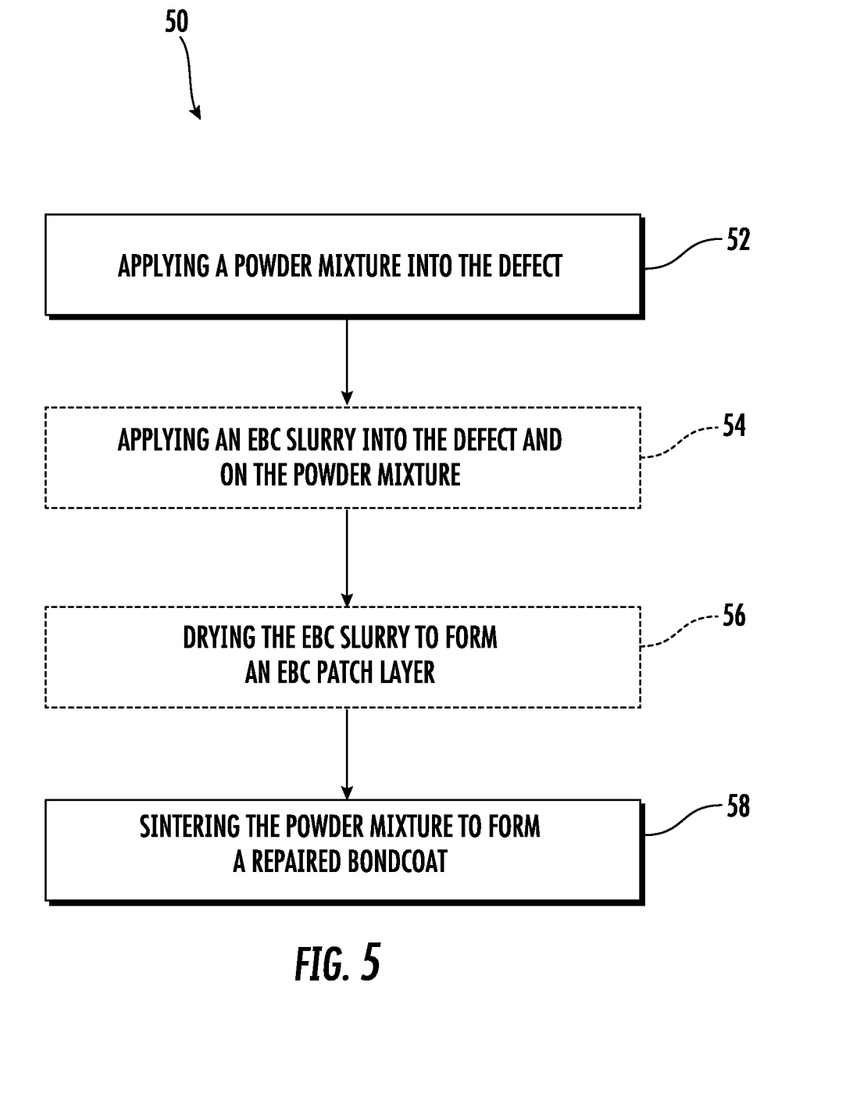
FIG. 5 is a flow chart diagram of an exemplary method of one embodiment for repairing a component having a defect (s) extending through its EBC.

Referring to FIG. 5, a method 50 is generally shown for repairing a defect on a silicon-containing substrate, such as described above. At 52, a powder mixture is applied into the defect. For example, the powder mixture comprises silicon and germanium at a Ge mole fraction of 0.01 to 0.3 as described above. At 54, an EBC slurry is optionally applied into the defect and on the powder mixture, as described above. At 56, the EBC slurry is optionally dried to form a dried EBC patch layer. At 58, the powder mixture is sintered to form a repaired bondcoat (and a repaired substrate if the defect extended through the bondcoat into the substrate), along with sintering the dried EBC patch layer (when present) to form a repaired EBC to collectively form a multilayer patch within the defect.

Further aspects are provided by the subject matter of the following clauses:

A method of repairing a defect on a silicon-containing substrate, the method comprising: applying a powder mixture into the defect of an existing coating on a surface of the silicon-containing substrate, wherein the powder mixture comprises silicon and germanium, wherein the powder mixture comprises germanium at a Ge mole fraction of 0.01 to 0.3; and heat treating the powder mixture within the defect at a sintering temperature that is 1150° C. to 1400° C. to form a repaired bondcoat within the defect.

A method of repairing a defect on a silicon-containing substrate, the method comprising: applying a powder mixture into the defect in a surface of the silicon-containing substrate, wherein the powder mixture comprises silicon and germanium, wherein the powder mixture comprises germanium at a Ge mole fraction of 0.01 to 0.3; and heat treating the powder mixture within the defect at a sintering temperature that is 1150° C. to 1400° C. to form a repaired substrate within the defect.

The method of any preceding clause, wherein the powder mixture comprises a silicon-based powder and a germanium-based powder.

The method of any preceding clause, wherein the powder mixture comprises a plurality of core-shell particles having a core surrounded by a shell, wherein the core comprises a silicon-based material, and wherein the shell comprises a germanium-based material.

The method of any preceding clause, wherein the core comprises silicon, and wherein the shell comprises germanium.

The method of any preceding clause, wherein the core consists essentially of silicon, and wherein the shell essentially of germanium.

The method of any preceding clause, wherein the powder mixture comprises a Ge mole fraction of germanium of 0.05 to 0.1.

The method of any preceding clause, wherein the powder mixture comprises a Si mole fraction of silicon of 0.7 to 0.99.

The method of any preceding clause, wherein the powder mixture comprises a Si mole fraction of silicon of 0.9 to 0.95.

The method of any preceding clause, wherein the sintering temperature is 1200° C. to 1375° C.

The method of any preceding clause, wherein the silicon in the powder mixture is elemental silicon, a silicon alloy having at least 90% by weight silicon, a metal silicide, or a combination thereof.

The method of any preceding clause, wherein the silicon in the powder mixture consists essentially of pure silicon.

The method of any preceding clause, wherein the germanium in the powder mixture is pure germanium, a germanium-based alloy having at least 90% by weight germanium, or a combination thereof.

The method of any preceding clause, wherein the germanium in the powder mixture consists essentially of pure germanium.

The method of any preceding clause, wherein the powder mixture is applied without a sintering aid present.

The method of any preceding clause, wherein the powder mixture is applied as a dry pack that is substantially free from a carrier fluid.

The method of any preceding clause, further comprising, prior to heat treating the powder mixture: applying an environmental barrier coating (EBC) slurry on the powder mixture, wherein the EBC slurry comprises an EBC patching material in an EBC fluid carrier, wherein the EBC patching material comprises an EBC powder and an EBC binder; and thereafter, drying the EBC slurry to form a dried EBC such that the dried EBC holds the powder mixture within the defect.

The method of any preceding clause, wherein the powder mixture is applied as a paste with a carrier fluid.

The method of any preceding clause, wherein the paste is substantially free of a binder.

The method of any preceding clause, wherein the paste is substantially free of a sintering aid.

The method of any preceding clause, wherein the paste consists essentially of the powder mixture and the carrier fluid.

The method of any preceding clause, wherein the silicon-containing substrate is a silicon-containing ceramic matrix composite.

A repaired component formed by the method of any preceding clause.

A repaired component, comprising: a silicon-containing substrate having a coating thereon, wherein the coating defines a defect; a repaired bondcoat formed within the defect on the silicon-containing substrate, wherein the repaired bondcoat comprises a silicon-germanium phase comprising a Ge mole fraction of germanium of 0.01 to 0.3 and a Si mole fraction of silicon of 0.7 to 0.99; and a sintered environmental barrier coating formed on the repaired bondcoat.

The repaired component of any preceding clause, wherein the silicon-germanium phase is a continuous phase.

The repaired component of any preceding clause, wherein the repaired bondcoat consists essentially of germanium and silicon prior to oxidation during use of the repaired component.

The repaired component of any preceding clause, wherein the silicon-containing substrate is a silicon-containing ceramic matrix composite.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A method of repairing a defect on a silicon-containing substrate, the method comprising:
    applying a powder mixture into the defect of an existing coating on a surface of the silicon-containing substrate, wherein the powder mixture comprises a silicon-based powder and a germanium-based powder, wherein the powder mixture comprises germanium at a Ge mole fraction of 0.01 to 0.3; and
    heat treating the powder mixture within the defect at a sintering temperature that is 1150° C. to 1400° C. to form a repaired bondcoat within the defect.

2. The method of claim 1, wherein the powder mixture comprises a Si mole fraction of silicon of 0.7 to 0.99.

3. The method of claim 1, wherein the powder mixture comprises a Ge mole fraction of germanium of 0.05 to 0.1, and wherein the powder mixture comprises a Si mole fraction of silicon of 0.9 to 0.95.

4. The method of claim 1, wherein the sintering temperature is 1200° C. to 1375° C.

5. The method of claim 1, wherein the silicon in the powder mixture is elemental silicon, a silicon alloy having at least 90% by weight silicon, a metal silicide, or a combination thereof.

6. The method of claim 1, wherein the germanium in the powder mixture is pure germanium, a germanium-based alloy having at least 90% by weight germanium, or a combination thereof.

7. The method of claim 1, wherein the silicon in the powder mixture consists essentially of pure silicon, and wherein the germanium in the powder mixture consists essentially of pure germanium.

8. The method of claim 1, further comprising, prior to heat treating the powder mixture:
applying an environmental barrier coating (EBC) slurry on the powder mixture, wherein the EBC slurry comprises an EBC patching material in an EBC fluid carrier, wherein the EBC patching material comprises an EBC powder and an EBC binder; and
thereafter, drying the EBC slurry to form a dried EBC such that the dried EBC holds the powder mixture within the defect.

9. The method of claim 1, wherein the powder mixture is applied as a paste with a carrier fluid.

10. The method of claim 9, wherein the paste is substantially free of a binder, wherein the paste is substantially free of a sintering aid, and wherein the paste consists essentially of the powder mixture and the carrier fluid.

11. The method of claim 1, wherein the defect extends into the silicon-containing substrate such that the powder mixture is applied into the defect within the silicon-containing substrate and within the defect of the existing coating.

12. The method of claim 1, wherein the silicon-containing substrate is a silicon-containing ceramic matrix composite.

13. A method of repairing a defect on a silicon-containing substrate, the method comprising:
applying a powder mixture into the defect of an existing coating on a surface of the silicon-containing substrate, wherein the powder mixture comprises silicon and germanium, wherein the powder mixture comprises germanium at a Ge mole fraction of 0.01 to 0.3, wherein the powder mixture comprises a plurality of core-shell particles having a core surrounded by a shell, wherein the core comprises a silicon-based material, and wherein the shell comprises a germanium-based material; and
heat treating the powder mixture within the defect at a sintering temperature that is 1150° C. to 1400° C. to form a repaired bondcoat within the defect.

14. The method of claim 13, wherein the core comprises silicon, and wherein the shell comprises germanium.

15. The method of claim 13, wherein the core consists essentially of silicon, and wherein the shell consists essentially of germanium.

16. A method of repairing a defect on a silicon-containing substrate, the method comprising:
applying a powder mixture into the defect of an existing coating on a surface of the silicon-containing substrate, wherein the powder mixture comprises a silicon-based powder and a germanium-based powder, wherein the powder mixture comprises germanium at a Ge mole fraction of 0.01 to 0.3, wherein the powder mixture is substantially free from a sintering aid; and
heat treating the powder mixture within the defect at a sintering temperature that is 1150° C. to 1400° C. to form a repaired bondcoat within the defect.

17. A method of repairing a defect on a silicon-containing substrate, the method comprising:
applying a powder mixture into the defect of an existing coating on a surface of the silicon-containing substrate, wherein the powder mixture comprises silicon and germanium, wherein the powder mixture comprises germanium at a Ge mole fraction of 0.01 to 0.3, wherein the powder mixture is applied as a dry pack that is substantially free from a carrier fluid; and
heat treating the powder mixture within the defect at a sintering temperature that is 1150° C. to 1400° C. to form a repaired bondcoat within the defect.

18. A method of repairing a defect on a silicon-containing substrate, the method comprising:
applying a powder mixture into the defect in a surface of the silicon-containing substrate, wherein the powder mixture comprises silicon and germanium, wherein the powder mixture comprises germanium at a Ge mole fraction of 0.01 to 0.3, and wherein the germanium in the powder mixture is pure germanium, a germanium-based alloy having at least 90% by weight germanium, or a combination thereof; and
heat treating the powder mixture within the defect at a sintering temperature that is 1150° C. to 1400° C. to form a repaired substrate within the defect.

* * * * *